No. 869,771. PATENTED OCT. 29, 1907.
A. B. CASE.
LAWN MOWER.
APPLICATION FILED JUNE 6, 1907.
2 SHEETS—SHEET 1.
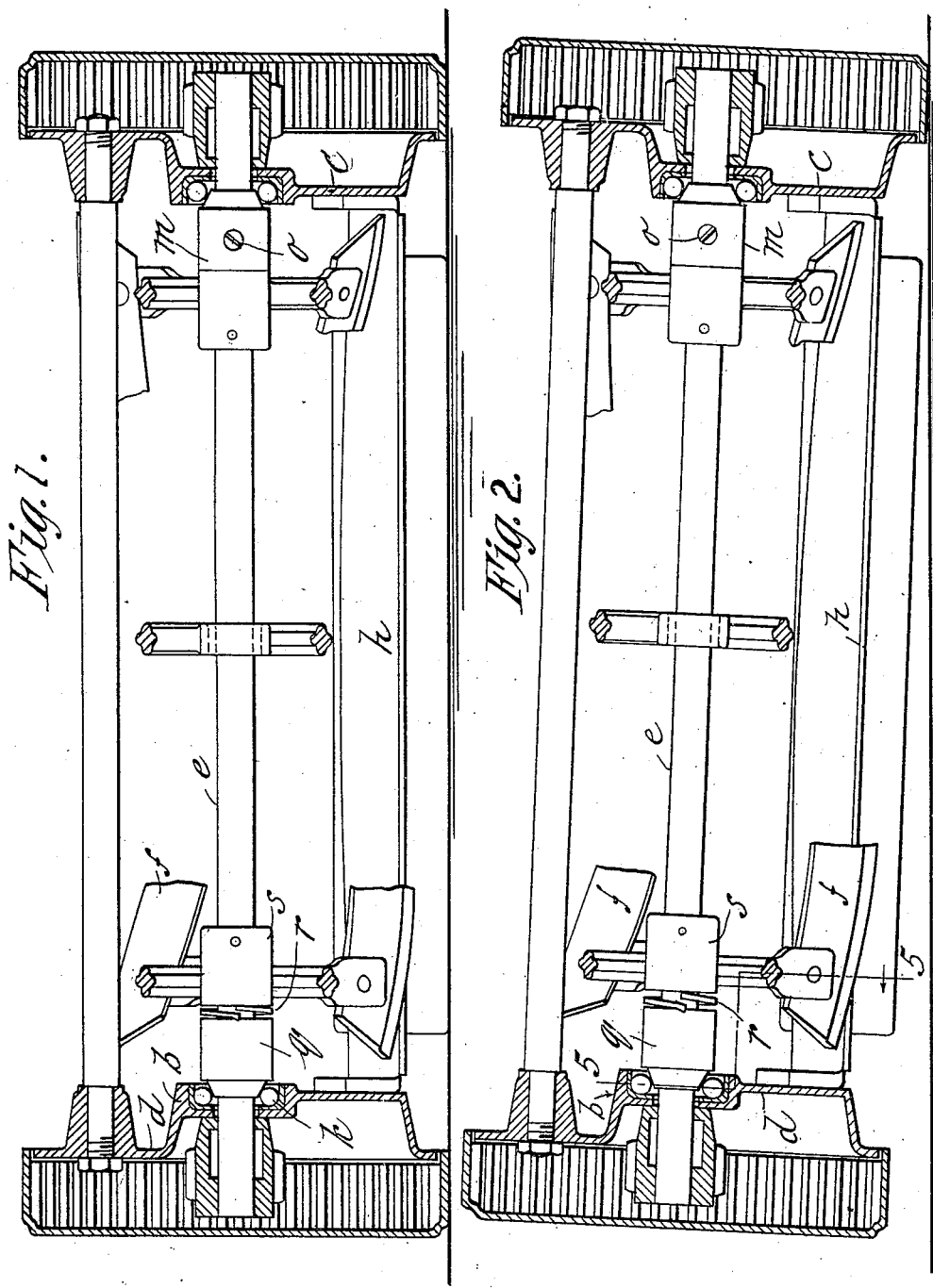

No. 869,771. PATENTED OCT. 29, 1907.
A. B. CASE.
LAWN MOWER.
APPLICATION FILED JUNE 6, 1907.
2 SHEETS—SHEET 2.
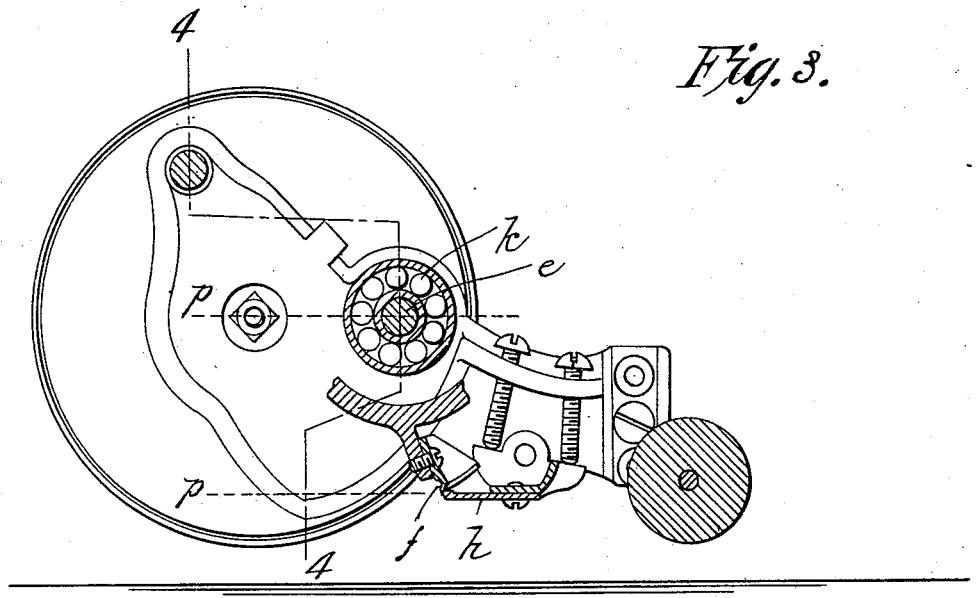
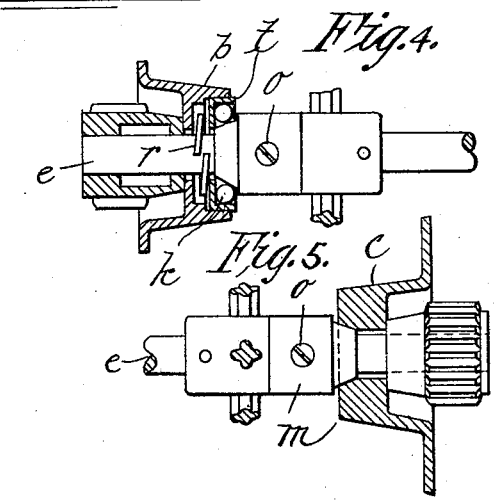

UNITED STATES PATENT OFFICE.

ADELBERT B. CASE, OF SPRINGFIELD, MASSACHUSETTS.

LAWN-MOWER.

No. 869,771.        Specification of Letters Patent.        Patented Oct. 29, 1907.

Application filed June 6, 1907. Serial No. 377,649.

*To all whom it may concern:*

Be it known that I, ADELBERT B. CASE, a citizen of the United States of America, residing at Springfield, in the county of Hampden and State of Massachusetts, have invented new and useful Improvements in Lawn-Mowers, of which the following is a specification.

This invention relates to lawn mowers, the object thereof being to provide an improved construction of these machines whereby the brushing contact of the rotary cutter with the edge of the stationary knife may be always maintained regardless of the working of the frame-parts, which is always present in lawn-mowers.

This fact is important in its bearing on the invention forming the subject matter of this application; no lawn-mower frame can be made so rigid that one of the side frames will not, in use, move more or less relative to the other, and as in all cases these two side plates carry the bearings for the opposite ends of the cutter-shaft, it is obvious that any movement, however slight, will necessarily change the relation of the edge of the rotary cutter to the edge of the stationary knife, which results in a short time in wearing a wavy edge on both the rotary cutter and the stationary knife whereby spaces between the meeting edges of the cutters and knife are established of sufficient width to accommodate blades of grass which are swept against the knife by the cutter; and these blades, not being sheared off, leave the lawn with a rough appearance after the mower has passed.

In all lawn-mowers, the cutter-shaft, as stated, is supported by its ends in the oppositely located side-plates of the frame, these plates being one-piece castings, and below and somewhat to the rear of the cutter-shaft bearings the stationary knife is secured. Therefore, if it were possible to always maintain the distance between the axis of the cutter-shaft and the fixed knife, it would always be possible to maintain a light brushing contact of the rotary knife with the edge of the stationary knife. In lawn-mowers as constructed under the present general practice, this is impossible, as will be set forth further on, and the present invention provides means to accomplish this result under all conditions of use, as will fully appear herein, reference being had to the accompanying drawings, in which,—

Figure 1 is a sectional longitudinal elevation of a machine embodying the invention and provided with ball-bearings for the rotary cutter-shaft, such as are generally used in machines of a higher grade, the machine being shown in a horizontal position. Fig. 2 is a view similar to Fig. 1 but showing the machine with the frame in a different position from normal. Fig. 3 is a sectional elevation in the plane of line 5—5, Fig. 2. Fig. 4 is a sectional view of a bearing showing a slight modification of the form of ball-bearing shown in Figs. 1 and 2. Fig. 5 is a sectional view of a portion of the frame and cutter-shaft showing a slight modification of the form of bearing.

In lawn-mowers of ordinary grade, it is the usual practice to use the so-called straight line bearing,—that is the straight bearings in these machines are formed in bosses on the two side frames by drilling and reaming them out with the frames put together in assembled form, but the "working" of the frame in use, that is the movement of one side relative to the other, makes it impossible to use a shaft for the rotary cutter which has a close fit in its bearings; it being customary to leave sufficient play between the shaft and its bearing so that the shaft will not be bound therein by the movements of the frame-parts. This play of the shaft in its bearings is well shown by the fact that if a lawn-mower of this grade be turned up side down, the cutter will revolve without touching the stationary knife. The natural result of this construction is that the rotary cutters must rest on the stationary knife, which, of course permits the knife to wear unevenly, and has the further disadvantage of permitting the cutter to be lifted by tough grass or by grass that is thickly bunched. A further disadvantage of the loose bearing of the cutter-shaft above referred to is that the knife-bar is worn in spots very much more rapidly when the frame is distorted than if the shaft were more closely fitted in its bearings.

To obviate the disadvantages of the straight line bearings and to obtain an easier running machine and more closely fitted bearings, manufacturers have resorted to the practice of providing ball-bearings for the cutter-shafts, and this type of machine is illustrated in Figs. 1 and 2, the invention forming the subject matter of this application being also embodied in the construction shown in said figures. In this construction, as ordinarily practiced, the balls $k$ are seated in an annular recess in a boss in the frame, and the cones $m$ are fixed on the cutter-shafts by screws $o$, or otherwise, as shown on the right-hand end of the cutter-shafts in Figs. 1 and 2, one end of each shaft being thus equipped. By means of these ball-bearings, the cutters may be so adjusted as to just brush the edge of the stationary knife, but they embody a disadvantage inherent therein from the nature of their construction, which is greater than the disadvantage inherent in the loosely fitted shafts in the straight line bearings above referred to for the reason that as the cones $m$ are tapered at the point of their support on the balls $k$ any distortion of the frame-parts permits the rotary cutter to move to a greater extent than is possible for it to move in said straight line bearings, as the degree of its movement in the last named bearings is more or less determined by the degree of "play" the cutter-shaft has in its bearings. Any racking of the frame of the lawn-mower therefore will result in a greater variation of the distance between the axis of the rotary cutter and the edge of the stationary knife in a machine fitted with ball-bearings, than in the form of construction embodying the straight line bearings. It is thus seen that both of these types embody disadvantageous characteristics and the obvious conclusion must be that to maintain under all conditions a light brushing contact of the rotary cutter against the edge of the stationary knife, it is only necessary to maintain absolutely a uniform distance between the axis of the rotary cutter at both ends of the shaft $e$ and the edge of the stationary knife.

The correct adjustment of the cutter to the knife is shown in the sectional view Fig. 3. The correct distance between the axis of the cutter and the knife is indicated in Fig. 3 by the parallel dotted lines $p$—$p$, and this distance is maintained under all conditions in which the machine may be used and under any strain to which the frame may be subjected by constructing the machine in such manner that endwise pressure is applied to the elements of the ball-bearings, or other bearing having a tapered bearing surface, whereby any racking of the frame which might permit the nearer approach of one part of the rotary cutter than another to the edge of the stationary knife, will be compensated for by a movement of the movable tapered bearing element towards its seat or vice versa to hold said element firmly against its seat, for so long as this contact is firmly maintained no variation of the distance between the axis of the rotary cutter and the edge of the stationary knife will be possible.

The preferred manner of carrying this construction into practice is that shown in Figs. 1 and 2, and it consists in positively securing the cone $m$ to the shaft $e$ on one end of the shaft, and having the cone $q$ on the opposite end free to move endwise thereon, and placing a stiff spring $r$ between the outer end of the cone $q$ and a suitable abutment fixed on the shaft. This abutment is conveniently provided by the hub $s$ of the spider of the rotary cutter. If desired, the alternative construction shown in Fig. 4 may be employed to produce the same result, that is by making the ball-cup $t$ movable towards and from the cone $q$ which in that case would be secured rigidly to the shaft. In either of these constructions, the spring $r$ would apply a constant end thrust on the shaft and thus maintain a constant position of contact between the tapered surfaces of the bearings at both ends of the shaft whereby the distance between the axis of the shaft and the edge of the stationary knife would be invariable under any conditions of stress to which the frame might be subjected when in use. If desired, the bearings for the ends of the shaft $e$ could be made as in Fig. 5, viz.,—with the tapered cone $m$ fixed to the shaft and bearing in a tapered recess in the boss $b$ of the side frame, but such a construction would be inferior, mechanically, to those described above, though entirely operative.

What I claim, is:—

1. In a lawn mower, a frame comprising oppositely placed rigid side frames, a stationary knife extending between said side frames and secured to each of them, a rotary cutter-shaft having a bearing at each end thereof, bearings in the side-fames, each of said bearings of the cutter-shaft having tapered contact surfaces, and means to prevent the separation of said contact surfaces from their seats in the bearings of the side-frames upon a change of the relation of one side frame relative to the other.

2. In combination, a lawn mower frame comprising rigid side frames, a stationary knife extending between the frames, a rotary cutter-shaft having a bearing in each of said side-frames, each of said bearings comprising a tapered bearing surface and a supporting element for said bearing surface; and means to maintain a yielding contact between said bearing surface and said supporting element.

ADELBERT B. CASE.

Witnesses:
WM. H. CHAPIN,
K. I. CLEMONS.